United States Patent Office 3,573,301
Patented Mar. 30, 1971

3,573,301
TRIAZINE COMPOUNDS AND PROCESS FOR THE PREPARATION
Roland A. E. Winter, Armonk, N.Y., assignor to Geigy Chemical Corporation, Ardsley, N.Y.
No Drawing. Filed Oct. 30, 1968, Ser. No. 772,033
Int. Cl. C07d 55/32
U.S. Cl. 260—249.6       8 Claims

ABSTRACT OF THE DISCLOSURE

Alkanolamino substituted-s-triazines are prepared by a process comprising reacting cyanuric chloride with an alkanolamine in the presence of an alkali or alkali earth metal oxide, hydroxide, carbonate or a bicarbonate in an organic medium substantially free of water. By this process novel 2,4,6-tris(N-alkyl alkanolamino)-s-triazine compounds are also prepared. These compounds are useful as cross-linking agents for polyesters or alkyds.

BACKGROUND OF THE INVENTION 2,4,6-tris-(2-hydroxyethylamino)-s-triazine may be prepared by a number of reactions. Kaiser et al., J. Am. Chem. Soc., 73, 2984 (1951) disclose a method for preparing said compound by reacting 2-chloro-4,6-bis-(2-hydroxyethylamino) - s - triazine with monoethanolamine. Thurston et al., J. Am. Chem. Soc., 73, 2992 (1951) and Schaefer et al., U.S. Patent No. 2,545,049 disclose a procedure for reacting monoethanolamine with triphenyl cyanurate to yield 2,4,6-tris-(2-hydroxyethylamino)-s-triazine. This compound may also be prepared by reacting monoethanolamine with melamine hydrochloride as disclosed by Dowbenko, J. Org. Chem., 29, 2766 (1964) and Dowbenko et al., U.S. Patent No. 3,244,713.

The above discussed methods of preparation, however, have a number of disadvantages. Said methods often are not very economical because they involve a number of reaction steps and generally produce low yields. Furthermore, some methods produce impure, dark, viscous, oily products which require extensive purifications before material of acceptable quality is obtained. Attempts were made in the past to simplify the method of preparation by reacting in a one-step reaction cyanuric chloride and ethanolamine. However, as pointed out by Thurston et al., the preparation by this method was difficult because of problems in the isolation.

DETAILED DESCRIPTION OF THE INVENTION

The present invention overcomes the deficiencies of the prior art in preparing alkanolamino triazines from cyanuric chloride. Thus, this invention provides a process for the preparation 2,4,6-tris-(alkanolamino)-s-triazines having the formula

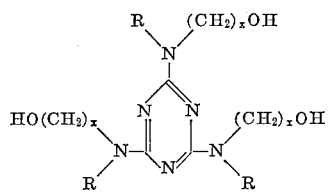

wherein R is hydrogen, an alkyl group having 1 to 12 carbon atoms or a hydroxyalkyl group having up to 12 carbon atoms and $x$ is an integer from 2 to 12, said process comprising reacting cyanuric chloride with an alkanolamine having the general formula

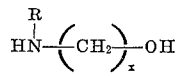

wherein R and $x$ are as defined above, the reaction being carried out in an ether solvent, such as tetrahydrofuran or dioxane, substantially in the absence of water and in the presence of an alkali or alkali earth metal oxide, hydroxide or carbonate.

As mentioned above, the two reactants are cyanuric chloride and an alkanolamine. The R group in alkanolamine represented above may be hydrogen or an alkyl group having from 1 to 12 carbon atoms, such as methyl, ethyl, propyl, isopropyl, n-butyl, n-pentyl, 2-methylpentyl, 4-propyloctyl, decyl and dodecyl. The R group may also be a hydroxyalkyl group, such as 2-hydroxyethyl, 3-hydroxypropyl, 1-methyl-2-hydroxethyl, 6-hydroxyhexyl, 3-methyl-8-hydroxyoctyl, 10-hydroxydecyl and 12-hydroxydodecyl.

Illustrative examples of alkanolamines which may be employed in this process are: monoethanolamine, 3-hydroxypropylamine, 2-methyl-2-hydroxypropylamine, 6-hydroxyhexylamine, 10-hydroxydecylamine and 12-hydroxydodecylamine, diethanolamine, di - 3 - hydroxypropylamine, diisopropanolamine, di-6-hydroxyhexylamine, di-12-hydroxydodecylamine, N-methyl ethanolamine, N-ethyl ethanolamine, N-isopropyl ethanolamine, N-ethyl-4-hydroxybutylamine, N-n-pentyl - 8 - hydroxyoctylamine, N-3-methylhexyl-12-hydroxydodecylamine, N-n - dodecyl-6-hydroxyhexylamine and the like.

Illustrative examples of the compounds which are prepared by the process of this invention are:

2,4,6-tris-(2-hydroxyethylamino)-s-triazine,
2,4,6-tris-(4-hydroxybutylamino)-s-triazine,
2,4,6-tris-(3-methyl-6-hydroxyhexylamino)-s-triazine,
2,4,6-tris-(9-hydroxynonylamino)-s-triazine,
2,4,6-tris-(3-ethyl-10-hydroxydecylamino)-s-triazine,
2,4,6-tris-[di(2-hydroxyethyl)amino]-s-triazine,
2,4,6-tris-[di(3-hydroxypropyl)amino]-s-triazine,
2,4,6-tris-[di(3-methyl-8-hydroxyoctyl)amino]-s-triazine,
2,4,6-tris-(N-methylethanolamino)-s-triazine,
2,4,6-tris-(N-isopropylethanolamino)-s-triazine,
2,4,6-tris-(N-hexyl-6-hydroxyhexylamino)-s-triazine,
2,4,6-tris-(N-dodecyl-12-hydroxydodecylamino)-s-triazine and the like.

The process of this invention is carried out in a substantially water-free reaction medium which may be either tetrahydrofuran or dioxane or any other ether in which the reactants are sufficiently soluble and which have sufficiently high boiling points. For example, additional ethers which may be employed as reaction media are di-n-propyl ether, ethyl n-butyl ether, di-n-butyl ether, di-n-amyl ether, diisoamyl ether, ethylene glycol dimethyl ether and the like. Although the low boiling ethers may be used in the process of this invention, they are less preferred because the reaction would then have to be generally carried out under pressure.

The temperature at which the reaction may be carried out may be in the range of from about room temperature to the reflux temperature of the reaction mixture and preferably from about 75° C. to about 125° C. and most preferably from about 95° C. to about 105° C. Ordinarily the instant process is carried out at an atmospheric pressure. However, if for some reason a lower boiling ether is employed as the reaction medium, the reaction then may be carried out under pressure.

Another important component in the process of this invention is the acid acceptor which may be an oxide, a hydroxide, a carbonate or a bicarbonate of an alkali or an alkali earth metal. Illustrative examples of useful acid acceptors are lithium oxide, sodium oxide, potassium oxide, rubidium oxide, cesium oxide, magnesium oxide, calcium oxide, barium oxide, lithium hydroxide, sodium hydroxide, potassium hydroxide, cesium hydroxide, magnesium hydroxide, calcium hydroxide, lithium carbonate, sodium carbonate, potassium carbonate, magnesium carbonate, calcium carbonate, strontium carbonate, lithium bicarbonate, sodium bicarbonate, potassium bicarbonate, rubidium bicarbonate, cesium bicarbonate and the like. The preferred acid acceptors are lithium, sodium and potassium carbonates and bicarbonates. The acid acceptors employed in this process should be preferably in a finely divided form.

Stoichiometrically, the process of this invention may be represented by the following chemical equation:

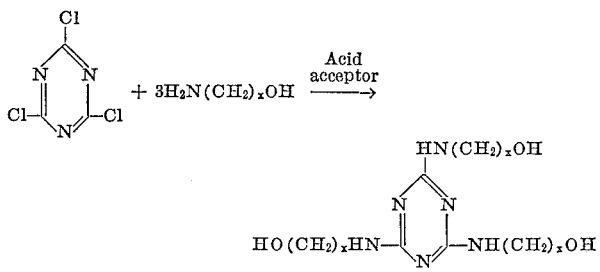

Thus, it may be seen that for every mole of cyanuric chloride three moles of an alkanolamine are needed. It is generally preferable to have a slight excess of an alkanolamine to insure that the product is completely substituted. The acid acceptor is used in at least a stoichiometric mount, that is, at least 3 moles of an acid acceptor for each mole of cyanuric chloride. However, often it is preferably used in greater amounts, such as up to 10 moles of an acid acceptor per each mole of cyanuric chloride.

To illustrate more specifically the process of this invention there are presented below the following examples.

Example I

In a 2-1 three-necked flask equipped with a stirrer, reflux condenser and a dropping funnel, 111 g. of cyanuric chloride was dissolved in 1200 ml. of dioxane at room temperature. To the clear solution 166 g. of anhydrous potassium carbonate was added. Then a solution of 121 g. of monoethanolamine in 60 ml. of dioxane was added dropwise with stirring. After the addition had been completed, the reaction mixture was heated at reflux with stirring for 4½ hrs. The hot dioxane solution was filtered to remove the inorganic salt residue which was washed with dioxane. The clear colorless dioxane solution was evaporated to remove most of the solvent. The residue, a clear colorless viscous syrup weighing 200 g., was dissolved in 400 ml. of n-butanol. From this solution there was obtained, after drying, 126.5 g. of 2,4,6 - tris - (2 - hydroxyethylamino) - s - triazine (81.5% yield), a white crystalline product which melted at 97–99° C.

In a duplicate run 136 g. (88% yield) of the product having a melting point of 97–99° C. was obtained.

Similar results are obtained when dioxane is replaced with tetrahydrofuran, di-n-propyl ether, diisoamyl ether and ethylene glycol dimethyl ether and when monoethanolamine is replaced with 3-hydroxypropylamine, 2-methyl - 3 - hydroxypropylamine, 5 - hydroxypentylamine and 6-hydroxyhexylamine.

Example II

The procedure of Example I was repeated except that 200.6 g. of diethanolamine was employed. A 67% of 2,4,6 - hexa - (2 - hydroxyethylamino) - s - triazine was obtained.

Comparable results are obtained when in this example diethanolamine is replaced with di-3-hydroxypropylamine, ethanolpropanolamine, diisopropanolamine and di-6-hydroxyhexylamine.

Similar results are obtained when in Examples I and II potassium carbonate is replaced with lithium oxide, sodium oxide, potassium oxide, magnesium oxide, barium oxide, sodium hydroxide, potassium hydroxide, calcium hydroxide, beryllium hydroxide, lithium carbonate, calcium carbonate, strontium carbonate, sodium bicarbonate, potassium bicarbonate, cesium bicarbonate and rubidium bicarbonate.

Example III

The procedure of Example I was repeated except that 149 g. of N-methyl ethanolamine was employed. An 83% yield of 2,4,6-tris-(N-methyl-2-hydroxyethylamino)-s-triazine, having a melting point of 65–67° C., was obtained.

Similar results are obtained when in Example III N-methyl ethanolamine is replaced with N-ethyl ethanolamine, N-isopropyl ethanolamine and N-3-methylhexyl-12-hydroxydodecylamine.

Example III, above, also exemplifies the preparation of a novel class of substituted triazine compounds having the general formula

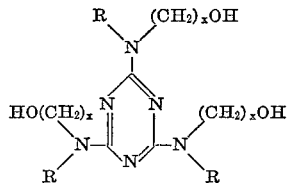

wherein R is an alkyl group having from 1 to about 12 carbon atoms, and preferably from 1 to 4 carbon atoms, and $x$ is an integer from 2 to about 12.

Illustrative examples of the novel compounds are 2,4,6-tris - (N - methyl ethanolamino)-s-triazine, 2,4,6-tris-(N-ethyl ethanolamine)-s-triazine, 2,4,6 - tris - (N - isopropyl ethanolamino)-s-triazine, 2,4,6-tris-(N-n - heptyl ethanolamino)-s-triazine, 2,4,6-tris-(N-dodecyl ethanolamino)-s-triazine, 2,4,6-tris-(N-n-butyl-6 - hydroxyhexylamino) - s-triazine, 2,4,6-tris-[N-(2-methylhexyl) (3-methyl-8-octanol)-amino]-s-triazine, 2,4,6-tris[N-dodecyl) (4-hydroxybutyl) - amino]-s-triazine, 2,4,6-tris[N-(n-pentyl)-(12-hydroxydodecyl)-amino]-s-triazine and the like.

A further aspect of this invention is the preparation of a still different class of substituted triazine compounds having the general formula

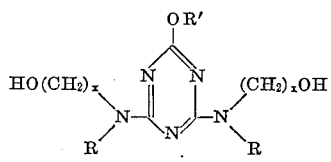

wherein R is hydrogen, alkyl group or a hydroxyalkyl group as defined above and R' is alkyl or an aryl group having up to about 18 carbon atoms. Illustrative examples of R' groups are methyl, propyl, hexyl, isopropyl, decyl, dodecyl, octadecyl, or phenyl, tolyl, xylyl, naphthyl and the like. The letter $x$ is as defined above.

The process for preparing the above mentioned compounds is basically the same as described in the above examples. Thus, in order to prepare 2,4-bis(2-hydroxyethylamino)-6-phenoxy-s-triazine, 2,4-dichloro-6-phenoxy-s-triazine is reacted with 2-hydroxyethylamine. In an analogous manner may be prepared 2,4-bis(4-hydroxybutylamino)-6-phenoxy-s-triazine, 2,4-bis(N - methylethanolamino)-6-methoxy - s - triazine, 2,4-bis(6-hydroxyhexylamino)-6-hexyloxy-s-triazine, 2,4-tetra-(3-hydroxypropylamino) - 6 - tolyloxy-s-triazine, 2-(2-hydroxyethylamino)-4,6-diphenoxy-s-triazine, 2-(4-hydroxybutylamino)-4,6-dibutoxy-s-triazine, and the like.

The process of this invention may also be employed in the preparation of substituted triazine compounds having the general formula

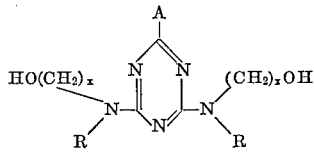

wherein A is an alkyl or an aryl group or a dialkyl- or a diarylamino group wherein said alkyl or aryl groups have up to about 12 carbon atoms, and $x$ is an integer from two to about 12. The preparation of a compound exemplified by the above formula wherein A is a dialkyl amino group is described in the following example.

Example IV

A solution of 92.5 g. of 2,4-dichloro-6-diethylamino-s-triazine in 800 ml. of dioxane was reacted as described in Example I with 52 g. of ethanolamine in the presence of potassium carbonate. The product, 2,4-bis(2-hydroxyethylamino)-6-diethylamino-s-triazine, was obtained in a 79% yield (88.9 g.). After recrystallization from benzene the product had a melting point of 100–102° C.

By following the procedure of this example the following illustrative compounds may also be prepared:

2,4-bis(4-hydroxybutylamino)-6-dimethylamino-s-triazine,
2,4-bis(6-hydroxyhexylamino)-6-dioctylamino-s-triazine,
2-(12-hydroxydodecylamino)-4,6-bis(diethylamino)-s-triazine,
2,4-bis(2-hydroxyethylamino)-6-methyl-s-triazine,
2,4-bis(3-hydroxypropylamino)-6-t-butyl-s-triazine and the like.

The novel compounds of this invention and generally the products obtained from the process of this invention are useful as intermediates in polymer synthesis, such as, the preparation of polyesters, alkyd resins and in polyurethane foams.

More specifically, the compounds of this invention may be used as cross-linking agents in the preparation of both polyesters and alkyds. For example, these compounds may be admixed with difunctional hydroxy compounds and co-reacted with dibasic acids and anhydrides, both saturated and unsaturated. This forms structures which on heating become insolubilized due to a complete reaction of all hydroxy groups. These compounds may be also used as components in polyurethanes by reacting them with isocyanates, such as toluene diisocyanate, in the presence of a conventional catalyst, to form a cross-linked urethane structure. Alternatively, the compounds may be condensed with propylene oxide to form a polyhydroxide polyol which may be reacted with an isocyanate, in the presence of a conventional catalyst and water or a fluorocarbon as a blowing agent, to form a foamed polyurethane. The end uses for polyesters and polyurethanes are well known. For example, polyesters may be used in making laminated structures or fiber glass reinforcements. Polyurethane may be used as an insulation material, especially the rigid foam type, while the soft, flexible polyurethane foam may be used for making cushions and padding.

What is claimed is:
1. A process for the preparation of 2,4,6-tris-(alkanolamino)-s-triazine having the formula

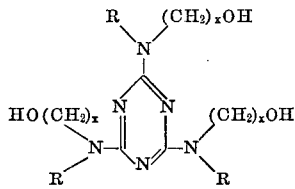

wherein R is hydrogen, and alkyl group having 1 to 12 carbon atoms or a hydroxyalkyl group having up to 12 carbon atoms and $x$ is an integer from 2 to 12, said process comprising reacting cyanuric chloride with an alkanolamine having the formula

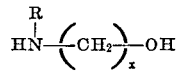

wherein R and $x$ are as defined above, the reaction being carried out in tetrahydrofuran or dioxane, substantially in the absence of water and in the presence of an acid acceptor selected from an alkali or alkali earth metal oxide, hydroxide or carbonate.

2. The process of claim 1 wherein said process is carried out at a temperature of from about 75° C. to about 125° C.

3. The process of claim 1 wherein said acid acceptor is an alkali metal carbonate.

4. The process of claim 3 wherein said acid acceptor is potassium carbonate.

5. The process of claim 4 wherein R group in said alkanolamine is alkyl and said process is carried out at a temperature of from about 75° C. to about 125° C.

6. The process of claim 1 wherein said alkanolamine is monoethanolamine, said acid acceptor is potassium carbonate and the reaction is carried out at a temperature of from about 95° C. to about 105° C.

7. A 2,4,6-tris-(N-alkyl alkanolamino)-s-triazine having the formula

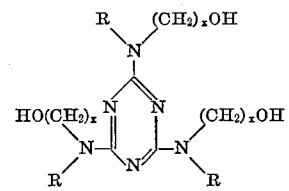

wherein R is an alkyl group having from 1 to 12 carbon atoms and $x$ is an integer from 2 to 12.

8. A compound of claim 7 wherein R is alkyl group having from 1 to 4 carbon atoms and $x$ is an integer of 2.

References Cited
UNITED STATES PATENTS

| | | | |
|---|---|---|---|
| 3,235,359 | 2/1966 | Auker | 260—249.5X |
| 3,244,713 | 4/1966 | Dowbenko et al. | 260—249.6X |
| 3,317,529 | 5/1967 | Beachem et al. | 260—249.6 |

JOHN M. FORD, Primary Examiner

U.S. Cl. X.R.

260—77.5, 2.5, 249.9, 249.8